(12) United States Patent
Yang et al.

(10) Patent No.: US 11,833,780 B2
(45) Date of Patent: Dec. 5, 2023

(54) RADIATIVE COOLING METAL PLATE, PREPARATION METHOD AND APPLICATION THEREOF

(71) Applicants: NINGBO RADI-COOL ADVANCED ENERGY TECHNOLOGIES CO., LTD., Ningbo (CN); NINGBO RUILING ADVANCED ENERGY MATERIALS INSTITUTE CO., LTD., Ningbo (CN)

(72) Inventors: Ronggui Yang, Ningbo (CN); Shaoyu Xu, Ningbo (CN); Zhixiong Chen, Ningbo (CN); Minghui Wang, Ningbo (CN); Huihui Yang, Ningbo (CN); Zhaolu Xia, Ningbo (CN); Peng Cao, Ningbo (CN)

(73) Assignees: NINGBO RADI-COOL ADVANCED ENERGY TECHNOLOGIES CO., LTD., Ningbo (CN); NINGBO RUILING ADVANCED ENERGY MATERIALS INSTITUTE CO., LTD., Ningbo (CN)

( * ) Notice: Subject to any disclaimer, the term of this patent is extended or adjusted under 35 U.S.C. 154(b) by 648 days.

(21) Appl. No.: 16/970,359

(22) PCT Filed: Apr. 29, 2020

(86) PCT No.: PCT/CN2020/087650
§ 371 (c)(1),
(2) Date: Aug. 16, 2020

(87) PCT Pub. No.: WO2021/212538
PCT Pub. Date: Oct. 28, 2021

(65) Prior Publication Data
US 2023/0150242 A1    May 18, 2023

(30) Foreign Application Priority Data

Apr. 20, 2020   (CN) .......................... 202010312422.8

(51) Int. Cl.
*B32B 15/08*   (2006.01)
*B32B 7/12*   (2006.01)
(Continued)

(52) U.S. Cl.
CPC ................ *B32B 15/08* (2013.01); *B32B 7/12* (2013.01); *B32B 15/18* (2013.01); *B32B 27/08* (2013.01);
(Continued)

(58) Field of Classification Search
CPC ................................ B32B 5/142; B32B 15/08
See application file for complete search history.

(56) References Cited

U.S. PATENT DOCUMENTS

2017/0248381 A1    8/2017   Yang et al.

FOREIGN PATENT DOCUMENTS

CN          107921761 A       4/2018
CN          108562110 A       9/2018
(Continued)

OTHER PUBLICATIONS

Machine Translation of CN 109210653 (Year: 2019).*
(Continued)

*Primary Examiner* — Zachary M Davis

(57) ABSTRACT

The present disclosure provides a radiative cooling metal plate, a preparation method and application thereof. The radiative cooling metal plate includes a metal substrate, a first adhesive layer and a radiative cooling functional layer stacked in order, the radiative cooling functional layer is located on a surface of the metal substrate, the first adhesive layer is arranged between the metal substrate and the radia-
(Continued)

tive cooling functional layer, and an elongation at break of the radiative cooling functional layer is in a range of 1% to 300%. The radiative cooling functional layer can have sufficient ductility, and can have sufficient deformation to cope with the bending of the radiative cooling functional layer during pressing, such that the radiative cooling functional layer will not be damaged or broken, thereby ensuring the structural integrity of the radiative cooling functional layer and great radiative cooling effect of the metal substrate.

20 Claims, 2 Drawing Sheets

(51) Int. Cl.
B32B 15/18 (2006.01)
B32B 27/08 (2006.01)
B32B 27/30 (2006.01)
B32B 27/32 (2006.01)
B32B 27/36 (2006.01)
B32B 37/12 (2006.01)

(52) U.S. Cl.
CPC ............ *B32B 27/304* (2013.01); *B32B 27/32* (2013.01); *B32B 27/36* (2013.01); *B32B 37/1207* (2013.01); *B32B 2037/1223* (2013.01); *B32B 2250/04* (2013.01); *B32B 2307/302* (2013.01); *B32B 2307/416* (2013.01)

(56) References Cited

FOREIGN PATENT DOCUMENTS

| | | |
|---|---|---|
| CN | 108891115 A | 11/2018 |
| CN | 109210653 A | 1/2019 |
| CN | 109449163 A | 3/2019 |
| CN | 109664574 A | 4/2019 |
| CN | 209240610 U | 8/2019 |
| CN | 110256836 A | 9/2019 |
| CN | 110306732 A | 10/2019 |
| CN | 110774673 A | 2/2020 |
| CN | 110977361 A | 4/2020 |
| CN | 210345949 U | 4/2020 |
| FR | 2917417 A1 | 1/2019 |
| JP | 2006198975 A | 8/2006 |
| KR | 102036071 B1 | 10/2019 |
| TW | 200950098 A | 12/2009 |
| TW | I598231 B | 9/2017 |
| WO | WO2018043298 A1 | 3/2018 |
| WO | WO2019083445 A1 | 5/2019 |

OTHER PUBLICATIONS

Machine Translation of CN 110256836 (Year: 2019).*
Machine Translation of CN 108891115 (Year: 2018).*
Search Report of TW109124474.
First Examination Report of TW109124474.
First Examination Report of AU2020220086.
European Search Report of 20020381.
China Office Action of 202010312422.8.
SG Search Report of 11202007968W.
International Search Report of PCT/CN2020/087650.

* cited by examiner

RADIATIVE COOLING METAL PLATE, PREPARATION METHOD AND APPLICATION THEREOF

CROSS-REFERENCE TO RELATED APPLICATIONS

This application is a 371 of international PCT patent application PCT/CN2020/087650 filed on Apr. 29, 2020, which claims all benefits accruing under 35 U.S.C. § 119 from China Patent Application No. 202010312422.8, filed on Apr. 20, 2020, with title of "RADIATIVE COOLING METAL PLATE, PREPARATION METHOD AND APPLICATION THEREOF", in the China National Intellectual Property Administration, the content of which is hereby incorporated by reference.

TECHNICAL FIELD

The present disclosure relates to the technical field of radiative cooling, and in particular, to a radiative cooling metal plate, a preparation method and an application thereof.

BACKGROUND

A metal substrate can be pressed into profiled plates with various wave types by a cold roll forming method, which are suitable for industrial and civil buildings, warehouses, special buildings, roofing surfaces, wall surfaces and outer wall decorations of large-span houses with steel structure, and the like, and have advantages of light quality, high strength, convenient construction and rapid, shock resistance, fire protection, and rain protection.

A radiative cooling functional layer located on the metal substrate can achieve a passive temperature reduction effect. The radiative cooling functional layer has a high emissivity at a wavelength of 8 μm to 13 μm. Therefore, heat can be transmitted to the outside space through the atmospheric window in a form of electromagnetic waves, that is, the radiative cooling functional layer plays a role of cooling. Furthermore, the radiative cooling functional layer has a high reflectivity in the solar wave band, in order to prevent accumulation of heat of sunlight on the metal substrate. During an installation process of such radiative cooling metal plate including the radiative cooling functional layer and the metal substrate, the radiative cooling functional layer needs to be bent, installed and fixed, resulting in fracture and damage, thereby affecting a radiative cooling effect and the service life thereof.

SUMMARY

According to one aspect of the present disclosure, a radiative cooling metal plate is provided. The radiative cooling metal plate can include a metal substrate, a first adhesive layer and a radiative cooling functional layer stacked in order. The radiative cooling functional layer is located on a surface of the metal substrate. The first adhesive layer is arranged between the metal substrate and the radiative cooling functional layer, and an elongation at break of the radiative cooling functional layer is in a range of 1% to 300%.

In one embodiment, an average reflectivity of the radiative cooling functional layer at a wavelength of 0.3 μm to 2.5 μm is greater than or equal to 75% and an average emissivity of the radiative cooling functional layer at a wavelength of 8 μm to 13 μm is greater than or equal to 85%.

In one embodiment, under any one of three following conditions where a xenon lamp aging time is greater than or equal to 1000 hours, a wet heat aging time is greater than or equal to 1000 hours, and a salt spray aging time is greater than or equal to 600 hours, an attenuations of an average reflectivity of the radiative cooling metal plate at a wavelength of 0.3 μm to 2.5 μm is less than or equal to 20%, and an attenuations of an average emissivity of the radiative cooling metal plate at a wavelength of 8 μm to 13 μm is also less than or equal to 20%.

In one embodiment, an adhesive force of the radiative cooling functional layer is 0 grade tested by a scribe test method.

In one embodiment, a thickness of the radiative cooling functional layer is in a range of 50 μm to 300 μm.

In one embodiment, the radiative cooling functional layer comprises an emissive layer, a material of the emissive layer comprises a first polymer, a mass ratio of the first polymer to the emissive layer is in a range of 85% to 100% teflon.

In one embodiment, the radiative cooling functional layer further comprises a reflective layer and a first protective layer.

In one embodiment, the reflective layer is located between the emissive layer and the first adhesive layer, the first protective layer is disposed on a surface of the emissive layer away from the reflective layer, and a ratio of a thickness of the reflective layer to that of the radiative cooling functional layer is in a range of 0.01% to 0.1%.

In one embodiment, the reflective layer comprises a middle portion and a packaging portion disposed at both ends of the middle portion, the packaging portion is configured to insulate and protect for the middle portion, a material of the middle portion comprises at least one of silver, aluminum, stainless steel, titanium, gold and copper, and a material of the packaging portion comprises alloy and/or metal oxide.

In one embodiment, a material of the first protective layer comprises a second polymer and a third polymer, a material of the second polymer is at least one of high weather resistance polyester, polyvinylidene fluoride, ethylene-tetrafluoroethylene copolymer, teflon and fluorocarbon resin, a material of the third polymer is poly methyl methacrylate, a mass ratio of the second polymer to the third polymer is 50:45-75:10.

In one embodiment, a thickness of the first protective layer is in a range of 20 μm to 150 μm.

In one embodiment, the radiative cooling metal plate further comprises a second adhesive layer disposed between the emissive layer and the first protective layer.

In one embodiment, a material of the first adhesive layer is a solvent type adhesive comprising at least one of polyurethane, polyacrylate, organosilicon, rubber and epoxy.

In one embodiment, a material of the first adhesive layer is a film type hot melt adhesive comprising at least one of ethylene acrylic acid copolymer, ethylene-vinyl acetate copolymer, poly methyl methacrylate, maleic anhydride grafted polymer, hydrogenated styrene-butadiene block copolymer, styrene-isoprene-styrene block copolymer, polystyrene-butadiene copolymer, polyurethane, hydrogenated petroleum resin, rosin resin, ethylene-butene copolymer and ethylene-octene copolymer.

In one embodiment, a thickness of the first adhesive layer is in a range of 3 μm to 25 μm.

In one embodiment, the radiative cooling metal plate further comprises a second protective layer which is a release layer, the second protective layer is disposed on a surface of the first protective layer away from the emissive layer, a material of the second protective layer comprises one of polyethylene terephthalate, polyethylene and polypropylene, a bonding force of the second protective layer is in a range of 50 g/25 mm to 500 g/25 mm.

In one embodiment, a thickness of the metal substrate is in a range of 100 μm to 2000 μm.

According to another aspect of the present disclosure, a method for preparing the above radiative cooling metal plate is provided, including following steps:

providing the metal substrate; and forming the first adhesive layer and the radiative cooling functional layer in order on the surface of the metal substrate.

In one embodiment, before the step of forming the first adhesive layer and the radiative cooling functional layer in order on the surface of the metal substrate, further comprising a step of cleaning the metal substrate.

According to another aspect of the present disclosure, a radiative cooling profiled metal plate is provided, wherein the radiative cooling profiled metal plate is formed by pressing the radiative cooling metal plate with a dedicated pressing device by a cold roll forming method.

Compared with the prior art, the preparation method of the present disclosure has the following advantages:

Firstly, the elongation at break of the radiative cooling functional layer is in a range of 1% to 300%, so that the radiative cooling functional layer can have sufficient ductility, and can have sufficient deformation to cope with the bending of the radiative cooling functional layer during pressing, biting and mounting. The radiative cooling functional layer will not be damaged or broken, thereby ensuring the structural integrity of the radiative cooling functional layer and great radiative cooling effect of the metal substrate. Secondly, the radiative cooling metal plate will not easy to thermal expansion, cold contraction or brittleness, and its structure is stable and reliable during outdoor use, and the radiative cooling metal plate has a relatively long service life. When the radiative cooling metal plate is applied, the indoor air temperature of a building can be decreased by about 5 degrees centigrade to 10 degrees centigrade without energy consumption than when the radiative cooling metal plate is not used, and energy consumption of an air conditioning can be decreased while the human body comfortability can be improved, which has a certain application prospect. Thirdly, the radiative cooling functional layer can be tightly attached to the metal substrate by the additional first adhesive layer, thus avoiding the problem that the radiative cooling functional layer is easily fall out when the radiative cooling functional layer can be directly contacted to the metal substrate with no additional adhesive layer.

The method for preparing the radiative cooling metal plate of the present disclosure is simple and reliable, and the obtained radiative cooling functional layer is prevented from being damaged or broken during the pressing process.

The radiative cooling metal plate of the present disclosure also has good radiative cooling effect, simple structure, easy transportation, high installation efficiency, and simple and reliable construction operations.

BRIEF DESCRIPTION OF THE DRAWINGS

For better description and illustration of embodiments and/or examples of the present disclosures herein, reference may be made to one or more of the figures. Additional details or examples for describing the figures should not be considered limiting of the scope of the present disclosure, the presently described embodiments and/or examples, and the best modes of the present disclosure as presently understood.

In the drawings.

100 represents a radiative cooling metal plate, 10 represents a metal substrate, 20 represents a first adhesive layer, 30 represents a radiative cooling functional layer, 31 represents an emissive layer, 32 represents a first protective layer, 33 represents a reflective layer, 331 represents a middle portion, 332 represents a packaging portion, 40 represents a second protective layer, 51 represents a first biting portion, 52 represents a second biting portion, 61 represents a first lapping portion, 62 represents a second lapping portion, 60 represents a fastener, 70 represents a seal element, and 80 represents a mounting bracket.

DETAILED DESCRIPTION

The technical proposals of the embodiments of the present disclosure will be clearly and completely described below by combining with drawings. It is obvious that the described embodiments are only a part and not all of the embodiments of the present disclosure. All other embodiments obtained by one skilled in the art based on the embodiments of the present disclosure without any creative efforts are within the scope of the present disclosure.

Unless otherwise defined, all technical and scientific terms used herein are the same as commonly understood by those skilled in the art. The terms used herein in the description of the present disclosure are for the purpose of describing particular embodiments only and are not intended to be limiting the scope of the present disclosure. As used herein, the term "and/or" includes any and all combinations of one or more related listed items.

The terms "first", "second" and the like herein are used to distinguish different objects, rather than to describe a particular order. Furthermore, the terms "comprising" and "having" and any variations thereof herein are intended to cover non-exclusive inclusion.

Radiative cooling is characterized by emitting heat from an object or a surface in a form of heat radiation, thereby lowering the temperature of the object or the surface, or maintaining a relatively low temperature when operating in a steady state. The heat radiation emitted from the non-zero temperature surface (with unit as K) depends on the continuous wavelength or spectrum of the surface temperature. The heat radiation emitted by objects near room temperature is mostly in the infrared regions of the electromagnetic spectrum.

The radiative cooling metal plate provided by the present disclosure can convert heat into an electromagnetic wave of a specific wavelength band (in a wavelength range of 8 μm to 13 μm), and radiate heat energy through an "atmospheric window" of the Earth (in a wavelength range of 8 μm to 13 μm) to outside space in a heat radiation manner.

Figure 1:
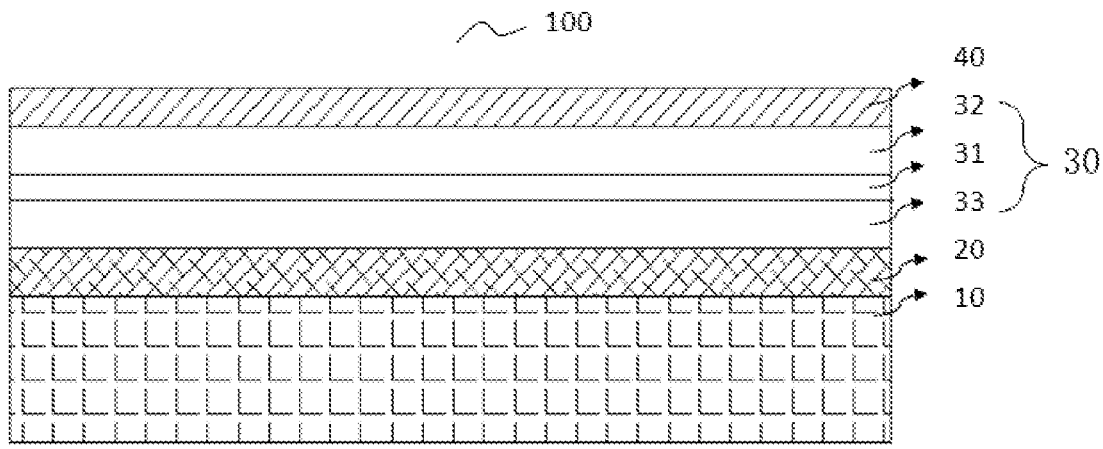
FIG. 1 is a schematic diagram of a radiative cooling metal plate in one embodiment of the present disclosure.

Referring to FIG. 1, it is a schematic structural view of a radiative cooling metal plate 100 provided by a preferred embodiment of the present disclosure.

The radiative cooling metal plate 100 can include a metal substrate 10, a first adhesive layer 20 and a radiative cooling functional layer 30 stacked in order. The radiative cooling functional layer 30 is disposed on a surface of the metal substrate 10. And the first adhesive layer 20 is disposed between the metal substrate and the radiative cooling functional layer 30.

The radiative cooling functional layer 30 has an elongation at break of 1% to 300%. There are two reasons for selecting the elongation at break with this range. Firstly, sufficient ductility can lead to a sufficient deformation in order to cope with the bending of the radiative cooling functional layer 30 during a pressing process, so that the radiative cooling functional layer 30 will not be damaged or broken, thereby ensuring a structural integrity of the radiative cooling functional layer 30 and a radiative cooling effect of the radiative cooling metal plate 100. Secondly, in the process of disposing the radiative cooling functional layer 30 on the metal substrate 10, if the ductility of the radiative cooling functional layer 30 is too high, the radiative cooling functional layer 30 is more stretched; and after disposing, the radiative cooling functional layer 30 may shrink due to its own stress. However, the metal substrate 10 is relatively stable, and then the radiative cooling functional layer 30 and the metal substrate 10 may generate a large stress difference. Thus, the radiative cooling functional layer 30 may be peeled off from the metal substrate 10. In order to avoid such a phenomenon, the elongation at break of the radiative cooling functional layer 30 specifically selects such described range.

When the radiative cooling metal plate 100 is applied, the indoor air temperature of a building can be decreased by about 5 degrees centigrade to 10 degrees centigrade without energy consumption than when the radiative cooling metal plate 100 is not used. And energy consumption of the air conditioning can be decreased while the human body comfort is raised, which has a certain economic application prospect.

The ductility of the radiative cooling functional layer 30 is proportional to the elongation at break thereof. The higher the elongation at break is, the better the ductility is. And preferably, the elongation at break of the radiative cooling functional layer 30 is in a range of 20% to 100%.

Because in the radiative cooling metal plate 100, the metal substrate 10 is passively cooled by the radiative cooling functional layer 30, the radiative cooling functional layer 30 has an average reflectivity of 75% in the wavelength of 0.3 μm to 2.5 μm, and an average emissivity of 85% in the wavelength of 8 μm to 13 μm. The radiative cooling effect of the radiative cooling functional layer 30 can greatly protect the metal substrate 10, such that the metal substrate 10 will not heat-expand and contract due to ambient temperature change during outdoor use, thereby it is not easy to brittle. Both the structure and performance of the radiative cooling metal plate 100 can be stable and reliable, and the service life can be extended.

Furthermore, there will be a good bonding force between the radiative cooling functional layer 30 and the metal substrate 10, and an adhesion force of the radiative cooling functional layer 30 is tested to be 0 grade by a scribe test method.

Furthermore, the radiative cooling functional layer 30 has a great passive cooling effect, and can also ensure that the first adhesive layer 20 has a better stability, and improve the bonding force between the radiative cooling functional layer 30 and the metal substrate 10.

Considering the radiative cooling metal plate 100 may be applied in outdoor, properties of certain corrosion resistance and weather resistance may be required when installing and using. Therefore, under any one of three following conditions where a xenon lamp aging time is greater than or equal to 1000 hours, a wet heat aging time is greater than or equal to 1000 hours, and a salt spray aging time is greater than or equal to 600 hours, an attenuations of an average reflectivity of the radiative cooling metal plate 100 at a wavelength of 0.3 μm to 2.5 μm is less than or equal to 20%, and an attenuations of an average emissivity of the radiative cooling metal plate 100 at a wavelength of 8 μm to 13 μm is also less than or equal to 20%.

Because the radiative cooling functional layer 30 is better to have hydrophobic and dustproof performances, a contact angle between the radiative cooling functional layer 30 and water in a preferred embodiment is greater than or equal to 90°. Generally, the larger the contact angle is, the smaller the wettability is, and the smaller the spreading is. Accordingly, a larger contact angle indicates that the radiative cooling functional layer 30 has a better hydrophobic effect. Preferably, the contact angle between the radiative cooling functional layer 30 and water is greater than or equal to 100 degrees.

In the present preferred embodiment, the radiative cooling functional layer 30 comprises a reflective layer 33, an emissive layer 31 and a first protective layer 32. The first protective layer 32 is disposed on a surface of the emissive layer 31 away from the reflective layer 33, so as to form a weather resistance protection for the reflective layer 33 and the emissive layer 31. The reflective layer 33 is disposed between the emissive layer 31 and the first adhesive layer 20. The radiative cooling functional layer 30 may break during pressing, and specifically, the elongation at break of the radiative cooling functional layer 30 depends on the emissive layer 31 and the first protection layer 32. When one of the emissive layer 31 and the first protection layer 32 is damaged, it can be determined that the radiative cooling functional layer 30 is damaged.

Furthermore, a material of the emissive layer 31 can include a first polymer. The first polymer can include at least one of poly (4-methyl-1-pentene), polyethylene terephthalate, polyethylene naphthalate, poly 1,4-cyclohexylene dimethylene terephthalate, poly (ethylene terephthalateco-1,4-cyclohexylene dimethylene terephthalate), poly (ethylene terephthalate-acetate), poly methyl methacrylate, polycarbonate, acrylonitrile styrene copolymer, acrylonitrile-butadiene styrene terpolymer, polyvinyl chloride, polypropylene, polyethylene, polyamide, ethylene-methyl acrylate copolymer, polyhydroxyethyl methacrylate, teflon, perfluoro(ethylene-propylene) copolymer, polyperfluoroalkoxy resin, polytrifluorochloroethylene, ethylene-chlorotrifluoroethylene copolymer, ethylene-tetrafluoroethylene copolymer, polyvinylidene fluoride,polyfluoroethylene, thermoplastic polyurethane, and polystyrene.

Preferably, the material of the emissive layer 31 can include at least one of poly (4-methyl-1-pentene), polyethylene terephthalate, polyethylene naphthalate, poly 1,4-cyclohexylene dimethylene terephthalate, poly (ethylene terephthalateco-1, 4-cyclohexylene dimethylene terephthalate), poly (ethylene terephthalate-acetate), poly methyl methacrylate, polycarbonate, ethylene-tetrafluoroethylene copolymer, polyvinylidene fluoride, polyfluoroethylene, and polystyrene.

Furthermore, the mass fraction of the first polymer to the emissive layer 31 is in a range of 85% to 100%.

In the present embodiment, a process of preparing the emissive layer 31 can include: conveying raw material, drying at a temperature of 50 degrees centigrade to 150 degrees centigrade, melt extruding at a processing temperature of 240 degrees centigrade to 280 degrees centigrade, casting, cooling at a cold roll temperature of 20 degrees centigrade to 150 degrees centigrade, drawing and winding in a range of a longitudinal drawing ratio of 4:1 to 10:1.

Considering the elongation at break of the radiative cooling functional layer 30 may be directly affected by the elongation at break of the emissive layer 31, in the present preferred embodiment, the elongation at break of the emissive layer 31 can be in a range of 20% to 280%, wherein a longitudinal elongation at break of the emissive layer 31 can be in a range of 20% to 280%, and a transverse elongation at break of the emissive layer 31 can be a range of 20% to 280%. More preferably, the elongation at break of the emissive layer 31 can be in a range of 20% to 160%, wherein the longitudinal elongation at break of the emissive layer 31 can be in a range of 40% to 160%, and the transverse elongation at break of the emissive layer 31 can be in a range of 20% to 120%. It can be understood that the minimum and maximum values of the elongation at break of the emissive layer 31 are determined by the minimum and maximum values of the transverse elongation at break and the longitudinal elongation at break thereof, respectively.

Furthermore, the emissive layer 31 can further include a filler. The filler can include at least one of an inorganic filler and an organic filler. The organic filler can be one or more of acrylic resin particles, silicone resin particles, and polystyrene resin particles. The inorganic filler can be one or more of silicon dioxide, silicon carbide, silicon nitride, aluminum hydroxide, aluminum oxide, zinc oxide, barium sulfide, magnesium silicate, barium sulfate, calcium carbonate, titanium dioxide, and titanium nitride. A particle size of the filler can be in a range of 0.1 μm to 20 μm.

Considering the filler and the first polymer uniformity dispersing in the emissive layer 31 and the emissivity of the emissive layer 31, the filler is preferably one or more of silicon dioxide, silicon carbide, silicon nitride, titanium nitride, titanium dioxide, silicone-based resin particles and polystyrene-based resin particles. The particle size of the filler is preferably in a range of 1 μm to 10 μm. The main influence factors of the elongation at break of the emissive layer 31 include a mass fraction of the filler in the emissive layer 31, the processing temperature of the emissive layer 31, and the longitudinal drawing ratio in processing. For example, if the mass fraction of the filler in the emissive layer 31 is increased, the emissivity of the emissive layer 31 may be increased, and if the mass fraction of the filler is decreased, the elongation at break of the emissive layer 31 may be increased; if the longitudinal drawing ratio after the casting is increased, the molecular orientation may be increased, and the molecular chain of the emissive layer 31 may be easily broken, such that the elongation at break may be decreased; and if the longitudinal drawing ratio after the casting is decreased, the transparency of the emissive layer 31 may be affected, and the appearance of the emissive layer 31 may further be affected; if the processing temperature is increased, the molecular chain of the emissive layer 31 may be easily broken and the elongation at break may be decreased; if the processing temperature is low, the fluidity of high molecular compound may be poor and the appearance of the emissive layer 31 may be affected. Therefore, in the present disclosure, the mass fraction of the filler in the emissive layer 31 is selected to be in a range of 0.1% to 10%, the processing temperature is in a range of 240 degrees centigrade to 280 degrees centigrade, and the longitudinal drawing ratio is in a range of 4:1 to 10:1.

Specifically, a plurality of experiments are also taken to prove the relationship between the main influence factors of the elongation at break of the emissive layer 31 and the elongation at break thereof as shown in Table 1 below.

TABLE 1

| Influence factors (range) | | Elongation at break/% | |
|---|---|---|---|
| | | Transverse | Longitudinal |
| Mass fraction of the filler in the emissive layer (wherein the processing temperature is 260 degrees centigrade and the longitudinal drawing ratio is 6:1) | 0.1%-10% | 1-280 | 20-300 |
| Processing temperature (wherein the mass fraction of the filler in the emissive layer is 1% and the longitudinal drawing ratio is 6:1) | 240 degrees centigrade- 280 degrees centigrade | 20-280 | 40-300 |
| Longitudinal drawing ratio (wherein the processing temperature is 260 degrees centigrade and the mass fraction of the filler in the emissive layer is 1%) | 4:1-10:1 | 30-280 | 50-300 |

Preferably, a plurality of experiments are also taken to prove the relationship between the main influence factors of the elongation at break of the emissive layer 31 and the elongation at break thereof as shown in Table 2 below.

TABLE 2

| Influence factors (Preferable range) | | Preferable elongation at break/% | |
|---|---|---|---|
| | | Transverse | Longitudinal |
| Mass fraction of the filler in the emissive layer (wherein the processing temperature is 260 degrees centigrade and the longitudinal drawing ratio is 6:1) | 0.5%-8% | 20-120 | 40-160 |
| Processing temperature (wherein the mass fraction of the filler in the emissive layer is 1% and the longitudinal drawing ratio is 6:1) | 170 degrees centigrade- 250 degrees centigrade | 40-120 | 60-160 |
| Longitudinal drawing ratio (wherein the processing temperature is 260 degrees centigrade and the mass fraction of the filler in the emissive layer is 1%) | 5:1-8:1 | 40-120 | 60-160 |

Of course, in addition to the first polymer and the filler, the emissive layer 31 can further include an additive. The additive is a processing aid, and the processing aid can be one or more of an antioxidant, a flame retardant, a plasticizer, a heat stabilizer, a light stabilizer, and an antistatic agent.

Furthermore, in order to improve the weather resistance of the first protective layer 32, a material of the first protective layer 32 includes a second polymer and a third polymer. A material of the second polymer is at least one of high weather resistance polyester, polyvinylidene fluoride, ethylene-tetrafluoroethylene copolymer, teflon and fluorocarbon resin. A material of the third polymer is poly methyl methacrylate. A mass ratio of the second polymer to the third polymer is 50:45-75:10. Of course, the first protective layer 32 may further include other additives.

Furthermore, a process of preparing the first protective layer 32 can include: conveying raw material, drying at a temperature of 50 degrees centigrade to 150 degrees centigrade, melt extruding at a processing temperature of 185 degrees centigrade to 235 degrees centigrade, casting, cooling at a cold roll temperature of 20 degrees centigrade to 150 degrees centigrade, drawing and winding in a range of a longitudinal drawing ratio of 4:1 to 8:1.

Considering that the elongation at break of the radiative cooling functional layer 30 is directly affected by the elongation at break of the first protective layer 32, in a preferred embodiment, the elongation at break of the first protective layer 32 can be in a range of 1% to 300%, wherein a longitudinal elongation at break of the first protective layer 32 can be in a range of 30% to 300%, and a transverse elongation at break of the first protective layer 32 can be in a range of 1% to 150%. More preferably, the elongation at break of the first protective layer 32 can be in a range of 20% to 200%, wherein the longitudinal elongation at break of the first protective layer 32 can be in a range of 50% to 200%, and the transverse elongation at break of the first protective layer 32 can be in a range of 20% to 100%. It can be understood that the minimum value of the elongation at break of the first protective layer 32 is determined by the minimum value of the transverse elongation at break thereof, and the maximum value of the elongation at break of the first protective layer 32 is determined by the maximum value of the longitudinal elongation at break.

Furthermore, the main influence factors of the elongation at break of the first protective layer 32 include the mass ratio of the second polymer to the third polymer in the first protective layer 32, the processing temperature of the first protective layer 32, and the longitudinal drawing ratio during processing. In the present disclosure, the mass ratio of the second polymer to the third polymer in the first protective layer 32 is (50-75):(10-45), the processing temperature is in a range of 185 degrees centigrade to 235 degrees centigrade, and the longitudinal drawing ratio is in a range of 4:1 to 8:1. Specifically, a plurality of experiments are also taken to prove the relationship between the main influence factors of the elongation at break of the first protective layer 32 and the elongation at break thereof as shown in Table 3 below.

TABLE 3

| Influence factors (range) | | Elongation at break/% | |
|---|---|---|---|
| | | Transverse | Longitudinal |
| Mass ratio of the second polymer to the third polymer (wherein the processing temperature is 200 degrees centigrade and the longitudinal drawing ratio is 6:1) | (50-75):(10-45) | 1-150 | 30-300 |
| Processing temperature (wherein the mass ratio of the second polymer to the third polymer is 60:20 and the longitudinal drawing ratio is 6:1) | 185 degrees centigrade- 235 degrees centigrade | 30-150 | 50-300 |
| Longitudinal drawing ratio (wherein the mass ratio of the second polymer to the third polymer is 60:20 and the processing temperature is 200 degrees centigrade) | 4:1-8:1 | 50-150 | 80-300 |

Preferably, a plurality of experiments are also taken to prove the relationship between the main influence factors of the elongation at break of the first protective layer 32 and the elongation at break thereof as shown in Table 4 below.

TABLE 4

| Influence factors (Preferable range) | | Preferable elongation at break/% | |
|---|---|---|---|
| | | Transverse | Longitudinal |
| Mass ratio of the second polymer to the third polymer (wherein the processing temperature is 200 degrees centigrade and the longitudinal drawing ratio is 6:1) | (55-70):(20-40) | 20-100 | 50-200 |
| Processing temperature (wherein the mass ratio of the second polymer to the third polymer is 60:20 and the longitudinal drawing ratio is 6:1) | 195 degrees centigrade-225 degrees centigrade | 20-100 | 50-200 |
| Longitudinal drawing ratio (wherein the mass ratio of the second polymer to the third polymer is 60:20 and the processing temperature is 200 degrees centigrade) | 5:1-7:1 | 20-100 | 50-200 |

A material of the reflective layer 33 may be metal or any other solar reflective material, such as at least one of silver, aluminum, stainless steel, titanium, gold, and copper. In a preferred embodiment, the material of the reflective layer 33 can include at least one of silver, aluminum, gold and copper.

Figure 2:
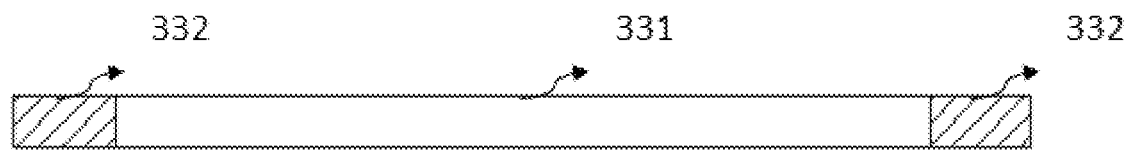
FIG. 2 is a schematic diagram of a reflective layer of a radiative cooling metal plate in another embodiment of the present disclosure.

In a preferred embodiment, as shown in FIG. 2, the reflective layer 33 includes a middle portion 331 and a packaging portion 332 disposed at both ends of the middle portion 331. And the packaging portion 332 is configured to protect the middle portion 331 from corrosion caused by permeation of gas or water molecules.

Preferably, a material of the middle portion 331 can include at least one of silver, aluminum, stainless steel, titanium, gold and copper, and a material of the packaging portion 332 can include at least one of an alloy and a metal oxide. The alloy of the package region 332 can include at least two of an Rn element, a Co element, a Cu element, an In element, an Nd element, a Ge element, an Sn element, an Si element, a Pt element, a Pd element, a Zn element, a Cd element, and an Au element. In this way, the obtained reflective layer 33 can extend the service life of the reflective layer 33 and prevent a problem of yellow edge aging in the middle portion 331 due to the alloy material of the packaging region 332.

Preferably, a thickness of the radiative cooling functional layer 30 is in a range of 50 μm to 300 μm, and a thickness of the first protection layer 32 is in a range of 20 μm to 150 μm.

Furthermore, a ratio of the thickness of the reflective layer 33 to that of the radiative cooling functional layer 30 can be in a range of 0.01% to 0.1%.

In a preferred embodiment, the reflective layer 33 can be a thin layer, which is deposited on a surface of the emissive layer 31 by magnetron sputtering, evaporating a coating film, ion sputtering, electroplating or electron beam coating. The influence of the reflective layer 33 on the elongation at break of the radiative cooling functional layer 30 is small, which may not be considered.

Due to the material of the emissive layer 31 including the first polymer, the emissive layer 31 can provide better ductility and ensure that the radiative cooling functional layer 30 does not break when the radiative cooling functional layer 30 is pressed.

Because the radiative cooling functional layer 30 should have a good adhesive effect with the metal substrate 10 during use to avoid degumming, the attenuation of the adhesive performance of the first adhesive layer 20 on the metal substrate in a present preferred embodiment is less than or equal to 2 grades under any condition of the xenon lamp aging time of greater than or equal to 1000 h, the wet heat aging time of greater than or equal to 1000 hours, and the salt spray aging time of greater than or equal to 600 hours.

When the thickness of the first adhesive layer 20 exceeds a certain value, phenomena of bubbling and wrinkling may show on a surface of the radiative cooling profiled metal plate, resulting in effecting the performance of the radiative cooling metal plate. The reason is that in a rolling process of the radiative cooling metal plate 100, the first adhesive layer 20 therein may be deformed due to stress; especially when the first adhesive layer 20 is thicker, the deformation are obvious. So that the phenomena of bubbling and wrinkling will show on the surface of the radiative cooling metal plate. Therefore, in order to avoid such phenomena, the thickness of the first adhesive layer 20 is preferably in a range of 3 μm to 25 μm. More preferably, the thickness of the first adhesive layer 20 is in a range of 5 μm to 20 μm. In general, the thickness of the first adhesive layer 20 is proportional to the adhesive force, the larger the thickness of the first adhesive layer 20 is, the larger the adhesive force between the radiative cooling functional layer 30 and the metal substrate 10 is. In a preferable embodiment, the material of the first adhesive layer 20 may be a solvent type adhesive, and the first adhesive layer 20 is formed by coating the solvent type adhesive on a surface of the metal substrate 10 and solidifying the solvent type adhesive. The material of the first adhesive layer 20 can include at least one of polyurethane, polyacrylate, organosilicon, rubber and epoxy.

In another preferable embodiment, the material of the first adhesive layer may be a film type hot melt adhesive, for example, a double-sided adhesive, which is used for bonding the radiative cooling functional layer 30 and the metal substrate 10 together. The material of the first adhesive layer 20 can include at least one of ethylene acrylic acid copolymer (EAA), ethylene-vinyl acetate copolymer (EVA), poly methyl methacrylate (PMMA), maleic anhydride grafted polymer, hydrogenated styrene-butadiene block copolymer (SEBS), styrene-isoprene-styrene block copolymer (SIS), polystyrene-butadiene copolymer (SBS), polyurethane (TPU), hydrogenated petroleum resin, rosin resin, ethylene-butene copolymer and ethylene-octene copolymer.

Specifically, when the first adhesive layer 20 is made of the film type hot melt adhesive, the adhesive temperature of the film type hot melt adhesive is in a range of 70 degrees centigrade to 150 degrees centigrade, and the adhesive pressure thereof is in a range of 0.1 MPa to 3 MPa.

Furthermore, the radiative cooling functional layer 30 further comprises a second adhesive layer disposed between the emissive layer 31 and the first protection layer 32. In order to improve the service life of the second adhesive layer, the second adhesive layer can further include an ultraviolet barrier, and the ultraviolet barrier can absorb ultraviolet lights and prevent aging of the emissive layer 31 and the reflective layer 33. The ultraviolet barrier can include at least one of benzophenones, benzotriazoles, and hindered amines.

In a preferred embodiment, a material of the metal substrate 10 can include at least one of an aluminum alloy, an aluminum magnesium manganese, a zinc plating plate, a tin plating plate, a composite steel, and a color coating steel. Preferably, a thickness of the metal substrate 10 is in a range of 100 µm to 2000 µm.

Further, in order to better protect the radiative cooling functional layer 30 and prevent the radiative cooling functional layer 30 from being damaged or broken by bending during subsequent pressing and installation, the radiative cooling metal plate 100 further can include a second protective layer 40. The second protective layer 40 can be a release layer, which is detachably disposed on one side of the first protective layer 32 away from the radiative cooling functional layer 30. And a material of the second protective layer 40 can include one of polyethylene terephthalate (PET), polyethylene (PE), and polypropylene (PP).

The second protection layer 40 can effectively protect the radiative cooling functional layer 30. In general, the second protective layer 40 may be peeled off from the surface of the radiative cooling functional layer 30 after the mounting is completed.

A pencil hardness of the second protective layer 40 is in a range of H to 4H, such that the second protective layer 40 can be pressed together with the radiative cooling functional layer 30, and the radiative cooling functional layer 30 can be prevented from scratching during pressing and mounting.

Preferably, a thickness of the second protective layer 40 is in a range of 30 µm to 100 µm, and more preferably, in a range of 40 µm to 75 µm.

Preferably, an adhesive force of the second protective layer 40 is in a range of 50 g/25 mm to 500 g/25 mm, and more preferably, in a range of 100 g/25 mm to 300 g/25 mm.

Due to the radiative cooling functional layer 30, the radiative cooling metal plate 100 of the present disclosure can have both high emissivity and high reflectivity and dissipate heat to the external space in highly efficiency without substantially absorbing solar heat, and meanwhile has the advantages of easy processing, transportation and disassembly because of the metal substrate 10, such that it is applicable to construct various types of buildings and repair peripheral shielding structures of buildings, for example, exterior walls and roofs of airports, high-speed railway stations, factories, warehouses and outdoor equipment such as electric cabinets.

Because a surface of the metal substrate 10 is generally rough, if the radiative cooling functional layer 30 is directly disposed thereon, the radiative cooling functional layer 30 may be easy to fall off because of poor adhesive effect. So that it is better to clean the surface of the metal substrate 10 firstly to remove impurities by a cleaning agent. Then the radiative cooling functional layer 30 and the metal substrate 10 can be easily bonded to each other, thereby making coating the radiative cooling functional layer 30 on the metal substrate 10 easier and accelerating the processing speed. In addition, the surface of the metal substrate 10 after cleaning is relatively smooth. When the radiative cooling functional layer 30 is bonded to the metal substrate 10, air bubbles between the two are relatively small, and the service life of the radiative cooling functional layer 30 can be avoided from being affected by water and oxygen.

A preferred embodiment of the present disclosure provides a method for preparing a radiative cooling metal plate 100. The method includes the following steps:

(1) providing a metal substrate 10; and (2) forming a first adhesive layer 20 and a radiative cooling functional layer 30 on a surface of the metal substrate 10 sequentially.

Furthermore, the method can further include:

(3) cleaning the surface of the metal substrate 10 before the step of forming the first adhesive layer 20 and the radiative cooling functional layer 30 on the surface of the metal substrate 10 sequentially.

In a preferred embodiment, the step of cleaning the surface of the metal can further include:

(3.1) providing a cleaning agent, and wetting the surface of the metal substrate 10 by the cleaning agent;

(3.2) brushing the surface of the metal substrate 10;

(3.3) spraying the surface of the metal substrate 10 with the cleaning agent;

(3.4) drying the cleaned metal substrate 10; and/or, (3.5) purging the surface of the metal substrate 10 using an external fan.

After the cleaning process, a roughness of the surface of the metal substrate 10 can be significantly reduced; specifically the dyne value of the metal substrate 10 is greater than 42 mN/m. In this way, when the radiative cooling functional layer 30 and the metal substrate 10 are bonded to each other, air bubbles can be significantly reduced between the radiative cooling functional layer 30 and the metal substrate 10 and they are easily adhere to each other.

In one embodiment, the step (2) of forming the first adhesive layer 20 and the radiative cooling functional layer 30 sequentially on the surface of the metal substrate 10 can further include:

(2.1) providing a solvent type adhesive, coating solvent type adhesive on the surface of the metal substrate 10, and baking the solvent type adhesive until the solvent in the solvent type adhesive evaporates to be a semi-dry state, and forming the first adhesive layer 20;

(2.2) providing the radiative cooling functional layer 30 and disposing the radiative cooling functional layer 30 on a surface of the first adhesive layer 20.Or, In another embodiment, the step (2) of forming the first adhesive layer 20 and the radiative cooling functional layer 30 sequentially on the surface of the metal substrate 10 can further include:

(2.3) providing a film type hot melt adhesive, and casting the film type hot melt adhesive to the surface of the radiative cooling functional layer 30 to form the first adhesive layer 20, and heating a steel plate to bond the first adhesive layer 20 on the steel plate;

(2.4) heating the metal substrate 10, transferring and disposing the radiative cooling functional layer 30 to the surface of the metal substrate 10 through the first adhesive layer 20.

Furthermore, the method can further include:

(4) providing a second protective layer 40, disposing the second protective layer 40 on a side of the radiative cooling functional layer 30 away from the first adhesive layer 20.

The preparation method of the radiative cooling metal plate 100 of the present disclosure is simple and reliable. The radiative cooling functional layer 30 can be effectively protected from being damaged and does not easily fall off during the pressing process.

It should be noted that various steps in the flowcharts herein are not necessarily performed sequentially in the order of the reference signs. The execution of these steps is not limited in strict order unless expressly described herein, and these steps may be performed in other order. Moreover, at least a part of the steps in the flowchart may include a plurality of sub-steps or a plurality of stages. These sub-steps or stages are not necessarily performed at the same time. Instead, it can be executed at different moments. The execution order of these sub-steps or stages is not necessarily performed successively. Instead, it may be performed alternatively or alternatively with. at least a portion of other steps or the sub-steps or stages of other steps.

Figure 3:
FIG. 3 is a schematic diagram of a biting type radiative cooling profiled metal plate in another embodiment of the present disclosure.
Figure 4:
FIG. 4 is a schematic diagram of a lapping type radiative cooling profiled metal plate in another embodiment of the present disclosure.
Figure 5:
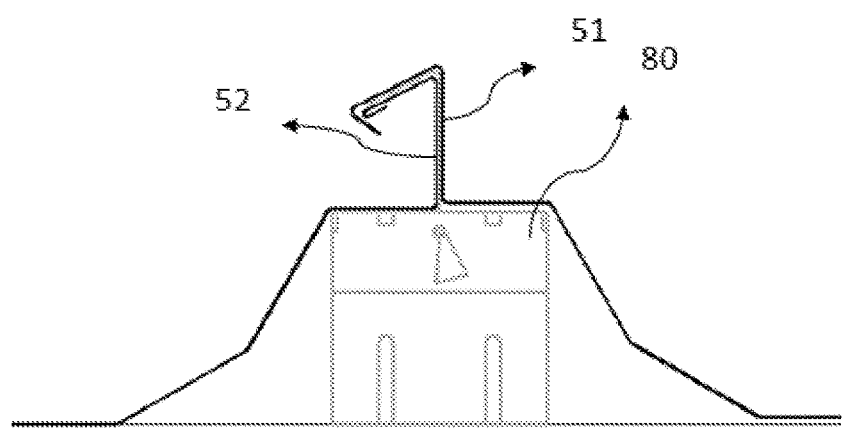
FIG. 5 is a schematic diagram of a fixed connection between a first biting portion and a second biting portion in another embodiment of the present disclosure.

Referring to FIGS. 3 to 5 together, a preferred embodiment of the present disclosure provides a radiative cooling profiled metal plate. The radiative cooling profiled metal plate is pressed by the above radiative cooling metal plate 100. Specifically, a process of pressing the radiative cooling metal plate 100 can include:

providing the radiative cooling metal plate 100, pressing the radiative cooling metal plate 100 with a dedicated pressing device by a cold roll forming method, forming a wavy interface along a width direction of the radiative cooling metal plate 100, and obtaining a radiative cooling profiled metal plate. According to a watt type and a connection manner, the radiative cooling profiled metal plate is divided into a biting type radiative cooling profiled metal plate and a lapping type radiative cooling profiled metal plate.

FIG. 3 shows the schematic diagram of the biting type radiative cooling profiled metal plate, and FIG. 5 shows a connection manner of a biting type radiative cooling profiled metal plate.

The connecting manner of the biting type radiative cooling profiled metal plate is as follows: providing a mounting bracket 80 and the biting type radiative cooling profiled metal plate, wherein an edge of the biting type radiative cooling metal plate are respectively provided with a first biting portion 51 and a second biting portion 52, and the first biting portion 51 and the second biting portion 52 extend along a longitudinal direction of the biting type radiative cooling profiled metal plate; and fixedly connecting the first biting portion 51 of one biting type radiative cooling profiled metal plate with the second biting portion 52 of another adjacent biting type radiative cooling profiled metal plate via the mounting bracket 80.

Figure 6:
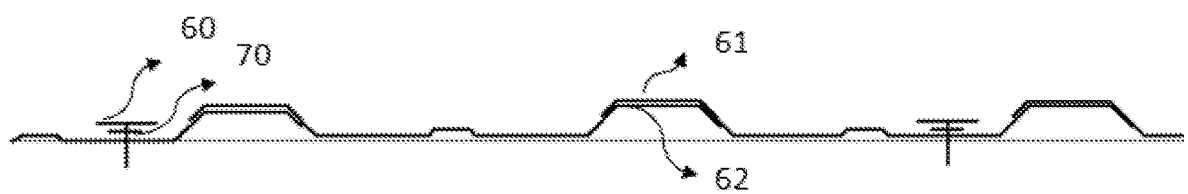
FIG. 6 is a schematic diagram of a fixed connection between a first lapping portion and a second lapping portion in another embodiment of the present disclosure.

FIG. 4 shows a schematic diagram of a lapping type radiative cooling profiled metal plate in another embodiment of the present disclosure, and FIG. 6 shows a connection manner of the lapping type radiative cooling profiled metal plate.

The connection manner of the lapping type radiative cooling profiled metal plate is as follows. The edges of the lapping type radiative cooling profiled metal plate are respectively provided with a first lapping portion 61 and a second lapping portion 62. The first lapping portion 61 and the second lapping portion 62 extend along the longitudinal direction of the lapping radiative cooling profiled metal plate. The first lapping portion 61 of one lapping type radiative cooling profiled metal plate is connected to the second lapping portion 62 of another adjacent lapping type radiative cooling profiled metal plate by lapping. A fastener 60 is fixed to a building at a flat position of the lapping type radiative cooling profiled metal plate.

In one embodiment, the radiative cooling metal plate 100 is protected by the second protective layer 40 adhered outside of the radiative cooling functional layer 30 during the pressing process. After the pressing process, the second protection layer 40 can be peeled off from the surface of the radiative cooling functional layer 30. Furthermore, if the surface of the radiative cooling functional layer 30 after the peeling is detected to check whether it is damaged, and coating transparent repair paint at the damaged portion for repairing.

Preferably, if the surface of the peeled radiative cooling functional layer 30 is damaged, the transparent repair paint may be applied at the damaged portion, and a material of the transparent repair paint includes polyurethane. Furthermore, the coating operation can be repeated at least one time to avoid further enlargement of an area of the damaged portion.

Referring to FIGS. 3 and 5, the edges of the biting type radiative cooling profiled metal plate are respectively provided with the first biting portion 51 and the second biting portion 52. The first biting portion 51 and the second biting portion 52 respectively extend in the width direction of the biting type radiative cooling profiled metal plate. The first biting portion 51 is used for fixedly connecting with the second biting portion 52 of the adjacent biting type radiative cooling profiled metal plate via the mounting bracket 80. By fixedly biting, the biting type radiative cooling metal plate does not need the fastener 60, so that the biting type radiative cooling profiled metal plate has better wind resistance and waterproof performance. It should be noted that, the first biting portion 51 and the second biting portion 52 may be 180 degrees biting, or 360 degrees biting, resulting in being applied in construction of various types of warehouses and factories.

Referring to FIGS. 4 and 6, the edges of the lapping type radiative cooling profiled metal plate are respectively provided with the first lapping portion 61 and the second lapping portion 62. The first lapping portion 61 and the second lapping portion 62 extend along the longitudinal direction of the lapping type radiative cooling profiled metal plate. The first lapping portion 61 is connected to the second lapping portion 62 of the adjacent lapping type radiative cooling profiled metal plate by lapping. The fastener 60 is fixed to the building at a flat position of the lapping type radiative cooling profiled metal plate.

Furthermore, the lapping type radiative cooling profiled metal plate can include a seal element 70 disposed between the fastener 60 and the first lapping portion. The fastener 60, the seal element 70 and the structural adhesive are used for sealing and waterproof treating at the junction, so as to prevent water vapor from entering, and obtain good wind resistance and waterproof performance. The lapping type radiative cooling profiled metal plate can be widely applied to outer wall surfaces of various industrial buildings, and roof structures of small-sized civil buildings or partial industrial buildings, such as factory, carport or warehouses.

The methods for mounting the biting type radiative cooling profiled metal plate and the lapping type radiative cooling profiled metal plate of the present disclosure has high efficiency, the construction operation is simple and reliable, and does not affect the radiative cooling effect and the service life.

Hereinafter, for better understanding of the present disclosure, preferred embodiments and comparative embodiments are provided. However, they are merely for illustrating the present disclosure and are not limited the scope thereof.

Embodiment 1

The radiative cooling metal plate can include:
an aluminum alloy metal substrate with a thickness of 100 μm;
a solvent type adhesive made of polyurethane with a thickness of 3 μm; and
a second protective layer made of polyethylene terephthalate with a thickness of 30 μm;
a radiative cooling functional layer including:
a reflective layer including a middle portion made of pure silver and an alloy layer disposed at both ends of the middle portion and having a thickness of 0.05 μm;
an emissive layer including a first polymer including poly 4-methyl-1-pentene, a filler being silica with a particle size of 3 μm, and the remaining being an additive, wherein a mass fraction of the poly 4-methyl-1-pentene in the emissive layer is 92%, a mass fraction of the filler in the emissive layer is 6%, and the thickness of the emissive layer is 50 μm;
a first protective layer including a high weather resistance polyester and poly methyl methacrylate, wherein a mass ratio of the high weather resistance polyester to the poly methyl methacrylate is 50:20, and a thickness of the first protective layer is 50 μm; and
a second adhesive layer including a benzophenone-based ultraviolet barrier.

The radiative cooling metal plate can be pressed into a radiative cooling profiled metal plate with a dedicated pressing device by a cold roll forming method.

Embodiment 2

The radiative cooling metal plate can include:
a magnesium aluminum manganese metal substrate with a thickness of 400 μm;
a solvent type adhesive made of polyacrylate with a thickness of 4 μm; and
a second protective layer made of polyethylene with a thickness of 50 μm;
a radiative cooling functional layer including:
a reflective layer including a middle portion made of stainless steel and a metal oxide layer disposed at both ends of the middle portion and having a thickness of 0.1 μm;
an emissive layer including a first polymer including polyethylene terephthalate, a filler being silicon nitride with a particle size of 5 μm, and the remaining being an additive, wherein a mass fraction of the polyethylene terephthalate in the emissive layer is 88%, a mass fraction of the filler in the emissive layer is 7%, and a thickness of the emissive layer is 100 μm;
a first protective layer including polyvinylidene fluoride and poly methyl methacrylate, wherein a mass ratio of polyvinylidene fluoride to poly methyl methacrylate is 60:25, and a thickness of the first protective layer is 20 μm; and
a second adhesive layer including a benzotriazole ultraviolet barrier.

The radiative cooling metal plate can be pressed into a radiative cooling profiled metal plate with a dedicated pressing device by a cold roll forming method.

Embodiment 3

The radiative cooling metal plate can include:
a galvanized metal substrate with a thickness of 900 μm;
an solvent type adhesive made of organosilicon with a thickness of 5 μm; and
a second protective layer made of polypropylene with a thickness of 100 μm;
a radiative cooling functional layer including:
a reflective layer including a middle portion made of stainless steel and an alloy layer disposed at both ends of the middle portion and having a thickness of 0.2 μm;
an emissive layer including a first polymer including polyethylene naphthalate, a filler being silicon carbide and silicone-based resin particles with a particle size of 0.1 μm (a mass ratio of the silicon carbide to silicone-based resin particles is 1:1), and the remaining being an additive, wherein a mass fraction of the polyethylene naphthalate in the emissive layer is 98%, a mass fraction of the filler in the emissive layer is 0.9%, and a thickness of the emissive layer is 300 μm;
a first protective layer including an ethylene-tetrafluoroethylene copolymer and poly methyl methacrylate, wherein a mass ratio of the ethylene-tetrafluoroethylene copolymer to the poly methyl methacrylate is 70:10, and a thickness of the first protective layer is 110 μm; and a second bonding layer including a hindered amine-based ultraviolet barrier.

The radiative cooling metal plate can be pressed into a radiative cooling profiled metal plate with a dedicated pressing device by a cold roll forming method.

Embodiment 4

This embodiment is substantially the same as Embodiment 1, except that:
a radiative cooling metal plate including:
a tin-plated metal substrate with a thickness of 1300 μm;
a rubber-based solvent type adhesive with a thickness of 6 μm;
a radiative cooling functional layer including:
a reflective layer including a titanium middle portion and a metal oxide layer disposed at both ends of the titanium middle portion, and having a thickness of 0.12 μm;
an emissive layer including a first polymer including a 1,4-cyclohexanedimethanol polyterephthalate, a filler being a silicone-based resin particle with a particle size of 10 μm, and the rest being an additive, wherein a mass fraction of the 1,4-cyclohexanedimethanol polyterephthalate in the emissive layer is 97%, a mass fraction of the filler in the emissive layer is 0.5%, and a thickness of the emissive layer is 200 μm;
a first protective layer including teflon and poly methyl methacrylate, wherein a mass ratio of teflon and poly methyl methacrylate is 55:25, and a thickness of the first protective layer is 150 μm.

The radiative cooling metal plate can be pressed into a radiative cooling profiled metal plate with a dedicated pressing device by a cold roll forming method.

Embodiment 5

This embodiment is substantially the same as Embodiment 1, except that:
a radiative cooling metal plate including:
a composite steel metal substrate with a thickness of 1700 μm;
an solvent type adhesive made of epoxy resin with a thickness of 8 μm;

a radiative cooling functional layer including:

a reflective layer including a gold middle portion and an alloy layer disposed at both ends of the gold middle portion, and having a thickness of 0.15 μm;

an emissive layer including a first polymer including polyethylene terephthalate-1,4-cyclohexanedimethanol ester, a filler being polystyrene-based resin with a particle size of 20 μm, and the rest being an additive, wherein a mass fraction of the polyethylene terephthalate-1,4-cyclohexanedimethanol ester in the emissive layer is 99%, a mass fraction of the filler in the emissive layer is 0.8%;

a first protective layer including fluorocarbon resin and poly methyl methacrylate, wherein a mass ratio of the fluorocarbon resin to the poly methyl methacrylate is 75:10, and a thickness of the first protective layer is 120 μm.

The radiative cooling metal plate can be pressed into a radiative cooling profiled metal plate with a dedicated pressing device by a cold roll forming method.

Embodiment 6

This embodiment is substantially the same as Embodiment 1, except that:

a radiative cooling metal plate including:

a coated colorful steel metal substrate with a thickness of 2000 μm;

a film type adhesive made of ethylene acrylic copolymer with a thickness of 10 μm;

a radiative cooling functional layer including:

a reflective layer including a copper middle portion and a metal oxide layer disposed at both ends of the copper middle portion, and having a thickness of 0.2 μm;

an emissive layer including a first polymer including polyethylene terephthalate, a filler being titanium dioxide and silica (a mass ratio of the titanium dioxide to the silica being 1:1) with a particle size being 15 μm, and the rest being an additive, wherein a mass fraction of the polyethylene terephthalate in the emissive layer is 88%, a mass fraction of the filler in the emissive layer is 8%.

The radiative cooling metal plate can be pressed into a radiative cooling profiled metal plate with a dedicated pressing device by a cold roll forming method.

Embodiment 7

This embodiment is substantially the same as Embodiment 1, except that:

a radiative cooling metal plate including:

a film type adhesive made of poly methyl methacrylate with a thickness of 12 μm;

a radiative cooling functional layer including:

an emissive layer including a first polymer including poly methyl methacrylate, and the rest being an additive, wherein a mass fraction of the poly methyl methacrylate in the emissive layer is 92%, and a mass fraction of the filler in the emissive layer is 5%.

The radiative cooling metal plate can be pressed into a radiative cooling profiled metal plate with a dedicated pressing device by a cold roll forming method.

Embodiment 8

This embodiment is substantially the same as Embodiment 1, except that:

a radiative cooling metal plate including:

a film type adhesive made of maleic anhydride grafted polymer with a thickness of 15 μm;

a radiative cooling functional layer including:

an emissive layer including a first polymer including polycarbonate, and the rest being an additive, wherein a mass fraction of the polycarbonate in the emissive layer is 97%, and a mass fraction of the filler in the emissive layer is 1%.

The radiative cooling metal plate can be pressed into a radiative cooling profiled metal plate with a dedicated pressing device by a cold roll forming method.

Embodiment 9

This embodiment is substantially the same as Embodiment 1, except that:

a radiative cooling metal plate can include:

a film type adhesive made of hydrogenated styrene-butadiene block copolymer with a thickness of 18 μm;

a radiative cooling functional layer including:

an emissive layer including a first polymer including acrylonitrile styrene copolymer, and the rest being an additive, wherein a mass fraction of the acrylonitrile styrene copolymer in the emissive layer is 99%, a mass fraction of the filler in the emissive layer is 0.1%.

The radiative cooling metal plate can be pressed into a radiative cooling profiled metal plate with a dedicated pressing device by a cold roll forming method.

Embodiment 10

This embodiment is substantially the same as Embodiment 1, except that:

a radiative cooling metal plate including:

a film type adhesive made of styrene-isoprene-styrene block copolymer with a thickness of 20 μm;

a radiative cooling functional layer including:

an emissive layer including a first polymer including acrylonitrile-butadiene styrene terpolymer, and the rest being an additive, wherein a mass fraction of the acrylonitrile-butadiene styrene terpolymer in the emissive layer is 89%, and a mass fraction of the filler in the emissive layer is 8%.

The radiative cooling metal plate can be pressed into a radiative cooling profiled metal plate with a dedicated pressing device by a cold roll forming method.

Embodiment 11

This embodiment is substantially the same as Embodiment 1, except that:

a radiative cooling metal plate including:

a film type adhesive made of polystyrene-butadiene copolymer with a thickness of 22 μm;

a radiative cooling functional layer including:

an emissive layer including a first polymer including polyvinyl chloride, and the rest is an additive, wherein a mass fraction of the polyvinyl chloride in the emissive layer is 91%, and a mass ratio of the filler in the emissive layer is 6%.

The radiative cooling metal plate can be pressed into a radiative cooling profiled metal plate with a dedicated pressing device by a cold roll forming method.

Embodiment 12

This embodiment is substantially the same as Embodiment 1, except that:

a radiative cooling metal plate including:

a film type adhesive made of polyurethane with a thickness of 25 μm;

a radiative cooling functional layer including:

an emissive layer including a first polymer including polypropylene, and the rest being an additive, wherein a mass fraction of the polypropylene in the emissive layer is 97%, and a mass fraction of the filler in the emissive layer is 0.9%.

The radiative cooling metal plate can be pressed into a radiative cooling profiled metal plate with a dedicated pressing device by a cold roll forming method.

Embodiment 13

This embodiment is substantially the same as Embodiment 1, except that:

a radiative cooling metal plate including:

a film type adhesive made of hydrogenated petroleum resin with a thickness of 15 μm;

a radiative cooling functional layer including:

an emissive layer including a first polymer including polyethylene, and the rest being an additive, wherein a mass fraction of the polyethylene in the emissive layer is 93%, and a mass ratio of the filler in the emissive layer is 4%.

The radiative cooling metal plate can be pressed into a radiative cooling profiled metal plate with a dedicated pressing device by a cold roll forming method.

Embodiment 14

This embodiment is substantially the same as Embodiment 1, except that:

a radiative cooling metal plate including:

a film type adhesive made of rosin resin with a thickness of 18 μm;

a radiative cooling functional layer including:

an emissive layer including a first polymer including polyvinylidene fluoride, and the rest being an additive, wherein a mass fraction of the polyvinylidene fluoride in the emissive layer is 89%, and a mass fraction of the filler in the emissive layer is 6%.

The radiative cooling metal plate can be pressed into a radiative cooling profiled metal plate with a dedicated pressing device by a cold roll forming method.

Embodiment 15

This embodiment is substantially the same as Embodiment 1, except that:

a radiative cooling metal plate including:

a film type adhesive made of ethylene-butene copolymer with a thickness of 12 μm;

a radiative cooling functional layer include:

an emissive layer including a first polymer including polyvinyl fluoride, and the rest being an additive, wherein a mass fraction of the polyvinyl fluoride in the emissive layer is 88%, and a mass fraction of the filler in the emissive layer is 9%.

The radiative cooling metal plate can be pressed into a radiative cooling profiled metal plate with a dedicated pressing device by a cold roll forming method.

Embodiment 16

This embodiment is substantially the same as Embodiment 1, except that:

a radiative cooling metal plate including:

a film type adhesive made of ethylene-octene copolymer with a thickness of 16 μm;

a radiative cooling functional layer including:

an emissive layer including a first polymer including polyamide, and the rest being an additive, wherein a mass fraction of the polyamide in the emissive layer is 94%, a mass fraction of the filler in the emissive layer is 2%.

The radiative cooling metal plate can be pressed into a radiative cooling profiled metal plate with a dedicated pressing device by a cold roll forming method.

Embodiment 17

This embodiment is substantially the same as Embodiment 1, except that:

a radiative cooling functional layer including:

an emissive layer including a first polymer including polyethylene, and the rest being an additive, wherein the mass fraction of the polyethylene in the emissive layer is 92%, and a mass fraction of filler in the emissive layer is 5%.

The radiative cooling metal plate can be pressed into a radiative cooling profiled metal plate with a dedicated pressing device by a cold roll forming method.

Embodiment 18

This embodiment is substantially the same as Embodiment 1, except that:

a radiative cooling functional layer including:

an emissive layer including a first polymer including ethylene-methyl acrylate copolymer, and the rest being an additive, wherein a mass fraction of the ethylene-methyl acrylate copolymer in the emissive layer is 87%, and a mass fraction of the filler in the emissive layer is 8%.

The radiative cooling metal plate can be pressed into a radiative cooling profiled metal plate with a dedicated pressing device by a cold roll forming method.

Embodiment 19

This embodiment is substantially the same as Embodiment 1, except that:

a radiative cooling functional layer including:

an emissive layer including a first polymer including polyhydroxyethyl methacrylate, and the rest being an additive, wherein a mass fraction of the polyhydroxyethyl methacrylate in the emissive layer is 93%, and a mass fraction of the filler in the emissive layer is 3%.

The radiative cooling metal plate can be pressed into a radiative cooling profiled metal plate with a dedicated pressing device by a cold roll forming method.

Embodiment 20

This embodiment is substantially the same as Embodiment 1, except that:

a radiative cooling functional layer including:

an emissive layer including a first polymer including teflon, and the rest being an additive, wherein a mass fraction of the teflon in the emissive layer is 95%, and a mass fraction of the filler in the emissive layer is 0.8%.

The radiative cooling metal plate can be pressed into a radiative cooling profiled metal plate with a dedicated pressing device by a cold roll forming method.

Embodiment 21

This embodiment is substantially the same as Embodiment 1, except that:
a radiative cooling functional layer including:
an emissive layer including a first polymer including perfluoro(ethylene-propylene) copolymer, and the rest being an additive, wherein a mass fraction of the perfluoro(ethylene-propylene) copolymer in the emissive layer is 99%, and a mass fraction of the filler in the emissive layer is 0.1%.

The radiative cooling metal plate can be pressed into a radiative cooling profiled metal plate with a dedicated pressing device by a cold roll forming method.

Embodiment 22

This embodiment is substantially the same as Embodiment 1, except that:
a radiative cooling functional layer including:
an emissive layer including a first polymer including polyperfluoroalkoxy resin, and the rest being an additive, wherein a mass fraction of the polyperfluoroalkoxy resin in the emissive layer is 85%, and a mass ratio of the filler in the emissive layer is 10%.

The radiative cooling metal plate can be pressed into a radiative cooling profiled metal plate with a dedicated pressing device by a cold roll forming method.

Embodiment 23

This embodiment is substantially the same as Embodiment 1, except that:
a radiative cooling functional layer including:
an emissive layer including a first polymer including polytrifluorochloroethylene, and the rest being an additive, wherein a mass fraction of the polytrifluorochloroethylene in the emissive layer is 93%, and a mass ratio of the filler in the emissive layer is 3%.

The radiative cooling metal plate can be pressed into a radiative cooling profiled metal plate with a dedicated pressing device by a cold roll forming method.

Embodiment 24

This embodiment is substantially the same as Embodiment 1, except that:
a radiative cooling functional layer including:
an emissive layer including a first polymer including ethylene-chlorotrifluoroethylene copolymer, and the rest being an additive, wherein a mass fraction of the ethylene-trifluorochloroethylene copolymer in the emissive layer is 96%, and a mass fraction of the filler in the emissive layer is 0.5%.

The radiative cooling metal plate can be pressed into a radiative cooling profiled metal plate with a dedicated pressing device by a cold roll forming method.

Embodiment 25

This embodiment is substantially the same as Embodiment 1, except that:
a radiative cooling functional layer including:
an emissive layer including a first polymer including ethylene-tetrafluoroethylene copolymer, and the rest being an additive, wherein a mass fraction of the ethylene-tetrafluoroethylene copolymer in the emissive layer is 99.8%, and a mass fraction of the filler in the emissive layer is 0.1%.

The radiative cooling metal plate can be pressed into a radiative cooling profiled metal plate with a dedicated pressing device by a cold roll forming method.

Embodiment 26

This embodiment is substantially the same as Embodiment 1, except that:
a radiative cooling functional layer including:
an emissive layer including a first polymer including polyvinylidene fluoride and polyfluoroethylene, and the rest being an additive, wherein a mass fraction of a total of the polyvinylidene fluoride and the polyfluoroethylene in the emissive layer is 86%, and a mass fraction of the filler in the emissive layer is 10%.

The radiative cooling metal plate can be pressed into a radiative cooling profiled metal plate with a dedicated pressing device by a cold roll forming method.

Embodiment 27

This embodiment is substantially the same as Embodiment 1, except that:
a radiative cooling functional layer including:
an emissive layer including a first polymer including thermoplastic polyurethane, and the rest being an additive, wherein a mass fraction of the thermoplastic polyurethane in the emissive layer is 95%, a mass fraction of the filler in the emissive layer is 1%.

The radiative cooling metal plate can be pressed into a radiative cooling profiled metal plate with a dedicated pressing device by a cold roll forming method.

Embodiment 28

This embodiment is substantially the same as Embodiment 1, except that:
a radiative cooling functional layer including:
an emissive layer including a first polymer including polyethylene, wherein a mass ratio of the polyethylene in the emissive layer being 100%.

The radiative cooling metal plate can be pressed into a radiative cooling profiled metal plate with a dedicated pressing device by a cold roll forming method.

Embodiment 29

This embodiment is substantially the same as Embodiment 1, except that the radiative cooling functional layer in this embodiment does not include any first protection layer.

The radiative cooling metal plate can be pressed into a radiative cooling profiled metal plate with a dedicated pressing device by a cold roll forming method.

Embodiment 30

This embodiment is substantially the same as Embodiment 1, except that the radiative cooling functional layer in this embodiment does not include any second adhesive layer.

The radiative cooling metal plate can be pressed into a radiative cooling profiled metal plate with a dedicated pressing device by a cold roll forming method.

Embodiment 31

This embodiment is substantially the same as Embodiment 1, except that the radiative cooling functional layer has a thickness of 10 µm.

The radiative cooling metal plate can be pressed into a radiative cooling profiled metal plate with a dedicated pressing device by a cold roll forming method.

Embodiment 32

This embodiment is substantially the same as Embodiment 1, except that the reflective layer in the radiative cooling functional layer is a pure silver layer.

The radiative cooling metal plate can be pressed into a radiative cooling profiled metal plate with a dedicated pressing device by a cold roll forming method.

Embodiment 33

This embodiment is substantially the same as Embodiment 1, except that the radiative cooling metal plate does not include any second protective layer.

Embodiment 34

This embodiment is substantially the same as Embodiment 2, except that a pencil hardness of a release protective film in the radiative cooling metal plate is 6B.

Embodiment 35

This embodiment is substantially the same as Embodiment 1, except that a pencil hardness in a release protective film in the radiative cooling metal plate is 9H.

Comparative Embodiment 1

This embodiment is substantially the same as Embodiment 1, except that an elongation at break of the radiative cooling functional layer is 312%, a material of the emissive layer is poly methyl methacrylate, and a mass fraction of the poly methyl methacrylate in the emissive layer is 92%, a material of the first protective layer includes poly methyl methacrylate and polyethylene terephthalate, wherein a mass ratio of poly methyl methacrylate to polyethylene terephthalate is 80:20, the elongation at break of the radiative cooling functional layer is 0.8%.

The radiative cooling metal plate can be pressed into a radiative cooling profiled metal plate with a dedicated pressing device by a cold roll forming method.

It was found that the radiative cooling functional layer of the radiative cooling metal plate was broken.

Comparative Embodiment 2

This embodiment is substantially the same as Embodiment 1, except that an elongation at break of the radiative cooling functional layer is 312%, a material of the emissive layer is an ethylene-vinyl acetate copolymer, and a mass fraction of the ethylene-vinyl acetate copolymer in the emissive layer is 92%. A material of the first protective layer can include an ethylene-vinyl acetate copolymer and a polyethylene, wherein a mass ratio of the ethylene-vinyl acetate copolymer to the polyethylene is 80:20.

The radiative cooling metal plate can be pressed into a radiative cooling profiled metal plate with a dedicated pressing device by a cold roll forming method.

It was found that: a phenomenon that the radiative cooling functional layer and an aluminum alloy metal substrate were separated from each other was appeared in the radiative cooling metal plate in use.

The radiative cooling metal plates prepared in Embodiments 1 to 35 and Comparative embodiments 1 to 2 were tested for the following performance, and the test standard and the test result are shown below.

Hardness test can be taken in reference of national standard GB/T6739-2006.

Elongation at break test can be taken in reference of national standard GB/T13022-1991. The radiative cooling functional layer is sandwiched between two clamps of a clamp. The two clamps will take relative movement. A force value sensor located on the moving chucks and a displacement sensor in a machine will collect force value changes and displacement changes during the test. When the force value is suddenly changed, it can be determined that the sample is broken. Thus, the elongation at break of the radiative cooling functional layer can be calculated.

Reflectivity R test can be taken as following. The reflectivity of a surface of the radiative cooling profiled metal plate can be measured with a spectrophotometer lambda 950 of Platinum Elmer at an incident angle of 5° and an average reflectivity of the whole spectrum (wavelength range of 0.3 μm to 2.5 μm) was calculated. The incident angle refers to an angle of light relative to a straight line perpendicular to the surface of the radiative cooling profiled metal plate.

Infrared wavelength band emissivity E test can be taken as follows: placing a the radiative cooling profiled metal plate into an infrared spectrometer of Bruker Invenior; and measuring an absorption degree of the radiative cooling profiled metal plate in a wavelength range of 8 μm to 13 μm, and measuring an interval of 1 nm. An average value of the absorbance of the radiative cooling profiled metal plate in the wavelength band of 8 μm to 13 μm is taken as the average absorbance A of the radiative cooling profiled metal plate. An average emissivity E is equal to the average absorbance A.

Xenon lamp aging time test can be taken as follows: after being sealed, the radiative cooling profiled metal plate is aged according to the circulation serial number 1 in Table 3 of 6.3 in the national standard GB/T16422, and the aging time is 1000 hours.

An attenuation value of the emissivity E of the radiative cooling profiled metal plate, an attenuation value of the reflectivity R of the radiative cooling profiled metal plate, and the attenuation value of the adhesion force of the radiative cooling functional layer can be tested after aging. The attenuation value refers to the performance before aging minus the performance after aging.

Humid heat aging time test is taken as follows. Referring to national standard GB/T1740, after being sealed, the radiative cooling profiled metal plate is tested under conditions of 60 degrees centigrade and 90% RH (that is, relative humidity), wherein the aging/testing time was 1000 hours.

An attenuation value of the emissivity E of the radiative cooling profiled metal plate, an attenuation value of the reflectivity R of the radiative cooling profiled metal plate, and the attenuation value of the adhesion force of the radiative cooling functional layer can be tested after aging. The attenuation value refers to the performance before aging minus the performance after aging.

Salt spray aging time test can be tested as follows. After being sealing, the radiative cooling profiled metal plate can be tested according to 5.2 neutral salt Atomization test in national standard GB/T10125, wherein a test time is 600 hours.

An attenuation value of the emissivity E of the radiative cooling profiled metal plate, an attenuation value of the reflectivity R of the radiative cooling profiled metal plate, and the attenuation value of the adhesion force of the radiative cooling functional layer can be tested after aging. The attenuation value refers to the performance before aging minus the performance after aging.

Adhesive force performance test can be taken as follows. Referring to 13 c scribe tests in national standard GB/T13448 and 14.5.2 cupping test after scribe test. The adhesive force between the metal substrate and the radiative cooling functional layer is characterized by a scribe test grade.

When edges of the radiative cooling functional layer are completely smooth, and no checkers fall off from the grid, the level of the scribe test can be regarded as 0 grade;

When the radiative cooling functional layer has a small sheet-like shedding at an intersection point, and a shedding area occupies no more than 5% of a grid area, the level of the scribe test can be regarded as 1 grade;

When the radiative cooling functional layer has a small sheet shedding along the edge of the cutout and the intersection, and a shedding area occupies 6% to 15% of the grid area, the level of the scribe test can be regarded as 2 grade;

When the radiative cooling functional layer falls along the side elongated strip of the cutout, the checkerboard is partially fall off, and the shedding area occupies 16% to 35% of the grid area, the level of the scribe test can be regarded as 3 grade;

When the radiative cooling functional layer falls along the side elongated strip of the cutout, the checkerboard is partially fall off, and the shedding area occupies 36% to 65% of the grid area, the level of the scribe test can be regarded as 4 grade;

When the radiative cooling functional layer is severely fall off, and the shedding area occupies more than 65%, the level of the scribe test can be regarded as 5 grade.

A materials and parameters of Embodiments 1 to 35 and Comparative embodiments 1 and 2 are shown in Table 5.

TABLE 5

| | Attenuation of xenon lamp aging time of 1000 h | Attenuation of wet heat aging time of 1000 h | Attenuation of salt spray aging time of 600 h | R/% | E/% | Adhesive force of radiative cooling functional layer | Pencil hardness of the second protective layer | Contact angle between the radiative cooling functional layer and water | Elongation at break of radiative cooling functional layer/% |
|---|---|---|---|---|---|---|---|---|---|
| Embodiment 1 | R: 3% E: 2% adhesive force: 0 grade | R: 3% E: 3% adhesive force: 0 grade | R: 2% E: 3% adhesive force: 0 grade | 90.2 | 92.4 | 0 grade | 2H | 115 | 31 |
| Embodiment 2 | R: 3% E: 3% adhesive force: 0 grade | R: 2% E: 3% adhesive force: 0 grade | R: 2% E: 3% adhesive force: 0 grade | 82.1 | 95.0 | 0 grade | 3B | 85 | 32 |
| Embodiment 3 | R: 2% E: 3% adhesive force: 0 grade | R: 2% E: 2% adhesive force: 0 grade | R: 3% E: 2% adhesive force: 0 grade | 85.4 | 91.3 | 0 grade | 2B | 96 | 45 |
| Embodiment 4 | R: 2% E: 1% adhesive force: 0 grade | R: 1% E: 2% adhesive force: 0 grade | R: 2% E: 1% adhesive force: 0 grade | 87.0 | 90.6 | 0 grade | 2H | 120 | 43 |
| Embodiment 5 | R: 2% E: 2% adhesive force: 0 grade | R: 2% E: 1% adhesive force: 0 grade | R: 1% E: 2% adhesive force: 0 grade | 91.6 | 90.4 | 0 grade | 2H | 105 | 55 |
| Embodiment 6 | R: 3% E: 2% adhesive force: 0 grade | R: 2% E: 2% adhesive force: 0 grade | R: 2% E: 2% adhesive force: 0 grade | 88.0 | 95.2 | 0 grade | 2H | 115 | 30 |
| Embodiment 7 | R: 3% E: 2% adhesive force: 0 grade | R: 3% E: 3% adhesive force: 0 grade | R: 2% E: 3% adhesive force: 0 grade | 90.6 | 91.3 | 0 grade | 2H | 115 | 35 |
| Embodiment 8 | R: 3% E: 2% adhesive force: 0 grade | R: 3% E: 3% adhesive force: 0 grade | R: 2% E: 3% adhesive force: 0 grade | 90.4 | 91.3 | 0 grade | 2H | 115 | 58 |
| Embodiment 9 | R: 3% E: 3% adhesive force: 0 grade | R: 3% E: 3% adhesive force: 0 grade | R: 2% E: 3% adhesive force: 0 grade | 90.6 | 88.4 | 0 grade | 2H | 115 | 65 |

TABLE 5-continued

| | Attenuation of xenon lamp aging time of 1000 h | Attenuation of wet heat aging time of 1000 h | Attenuation of salt spray aging time of 600 h | R/% | E/% | Adhesive force of radiative cooling functional layer | Pencil hardness of the second protective layer | Contact angle between the radiative cooling functional layer and water | Elongation at break of radiative cooling functional layer/% |
|---|---|---|---|---|---|---|---|---|---|
| Embodiment 10 | R: 3% E: 2% adhesive force: 0 grade | R: 2% E: 3% adhesive force: 0 grade | R: 2% E: 3% adhesive force: 0 grade | 90.2 | 93.4 | 0 grade | 2H | 115 | 30 |
| Embodiment 11 | R: 3% E: 2% adhesive force: 0 grade | R: 3% E: 3% adhesive force: 0 grade | R: 2% E: 3% adhesive force: 0 grade | 90.4 | 92.5 | 0 grade | 2H | 115 | 35 |
| Embodiment 12 | R: 3% E: 2% adhesive force: 0 grade | R: 3% E: 3% adhesive force: 0 grade | R: 2% E: 3% adhesive force: 0 grade | 90.3 | 90.0 | 0 grade | 2H | 115 | 240 |
| Embodiment 13 | R: 3% E: 3% adhesive force: 0 grade | R: 3% E: 3% adhesive force: 0 grade | R: 3% E: 3% adhesive force: 0 grade | 90.5 | 90.4 | 0 grade | 2H | 115 | 44 |
| Embodiment 14 | R: 3% E: 3% adhesive force: 0 grade | R: 3% E: 3% adhesive force: 0 grade | R: 3% E: 3% adhesive force: 0 grade | 90.1 | 91.2 | 0 grade | 2H | 115 | 30 |
| Embodiment 15 | R: 3% E: 3% adhesive force: 0 grade | R: 3% E: 3% adhesive force: 0 grade | R: 2% E: 3% adhesive force: 0 grade | 90.9 | 93.1 | 0 grade | 2H | 115 | 28 |
| Embodiment 16 | R: 3% E: 2% adhesive force: 0 grade | R: 3% E: 3% adhesive force: 0 grade | R: 2% E: 3% adhesive force: 0 grade | 90.3 | 91.4 | 0 grade | 2H | 115 | 40 |
| Embodiment 17 | R: 3% E: 3% adhesive force: 0 grade | R: 3% E: 3% adhesive force: 0 grade | R: 2% E: 3% adhesive force: 0 grade | 90.1 | 91.0 | 0 grade | 2H | 115 | 40 |
| Embodiment 18 | R: 3% E: 2% adhesive force: 0 grade | R: 3% E: 3% adhesive force: 0 grade | R: 3% E: 3% adhesive force: 0 grade | 90.5 | 92.4 | 0 grade | 2H | 115 | 38 |
| Embodiment 19 | R: 3% E: 2% adhesive force: 0 grade | R: 3% E: 3% adhesive force: 0 grade | R: 3% E: 3% adhesive force: 0 grade | 90.4 | 90.5 | 0 grade | 2H | 115 | 65 |
| Embodiment 20 | R: 3% E: 3% adhesive force: 0 grade | R: 3% E: 2% adhesive force: 0 grade | R: 3% E: 3% adhesive force: 0 grade | 90.2 | 91.2 | 0 grade | 2H | 115 | 75 |
| Embodiment 21 | R: 3% E: 2% adhesive force: 0 grade | R: 3% E: 3% adhesive force: 0 grade | R: 2% E: 3% adhesive force: 0 grade | 90.5 | 87.6 | 0 grade | 2H | 115 | 72 |
| Embodiment 22 | R: 3% E: 2% adhesive force: 0 grade | R: 3% E: 2% adhesive force: 0 grade | R: 2% E: 3% adhesive force: 0 grade | 90.1 | 93.5 | 0 grade | 2H | 115 | 38 |
| Embodiment 23 | R: 3% E: 3% adhesive force: 0 grade | R: 3% E: 3% adhesive force: 0 grade | R: 2% E: 3% adhesive force: 0 grade | 90.5 | 92.4 | 0 grade | 2H | 115 | 55 |

TABLE 5-continued

| | Attenuation of xenon lamp aging time of 1000 h | Attenuation of wet heat aging time of 1000 h | Attenuation of salt spray aging time of 600 h | R/% | E/% | Adhesive force of radiative cooling functional layer | Pencil hardness of the second protective layer | Contact angle between the radiative cooling functional layer and water | Elongation at break of radiative cooling functional layer/% |
|---|---|---|---|---|---|---|---|---|---|
| Embodiment 24 | R: 3% E: 2% adhesive force: 0 grade | R: 3% E: 3% adhesive force: 0 grade | R: 2% E: 3% adhesive force: 0 grade | 90.0 | 89.1 | 0 grade | 2H | 115 | 78 |
| Embodiment 25 | R: 3% E: 2% adhesive force: 0 grade | R: 3% E: 3% adhesive force: 0 grade | R: 2% E: 3% adhesive force: 0 grade | 90.8 | 88.7 | 0 grade | 2H | 115 | 77 |
| Embodiment 26 | R: 3% E: 2% adhesive force: 0 grade | R: 3% E: 3% adhesive force: 0 grade | R: 2% E: 3% adhesive force: 0 grade | 89.2 | 93.2 | 0 grade | 2H | 115 | 36 |
| Embodiment 27 | R: 3% E: 2% adhesive force: 0 grade | R: 2% E: 3% adhesive force: 0 grade | R: 2% E: 3% adhesive force: 0 grade | 90.5 | 90.2 | 0 grade | 2H | 115 | 100 |
| Embodiment 28 | R: 6% E: 4% adhesive force: 0 grade | R: 6% E: 4% adhesive force: 0 grade | R: 5% E: 3% adhesive force: 0 grade | 90.6 | 88.3 | 0 grade | 2H | 115 | 274 |
| Embodiment 29 | R: 6% E: 5% adhesive force: 1 grade | R: 6% E: 5% adhesive force: 2 grade | R: 4% E: 5% adhesive force: 2 grade | 90.2 | 92.1 | 0 grade | 2H | 90 | 27 |
| Embodiment 30 | R: 8% E: 3% adhesive force: 0 grade | R: 3% E: 4% adhesive force: 0 grade | R: 5% E: 5% adhesive force: 0 grade | 90.5 | 91.4 | 0 grade | 2H | 115 | 28 |
| Embodiment 31 | R: 4% E: 3% adhesive force: 0 grade | R: 4% E: 5% adhesive force: 0 grade | R: 3% E: 4% adhesive force: 0 grade | 90.8 | 85.9 | 0 grade | 2H | 115 | 24 |
| Embodiment 32 | R: 7% E: 5% adhesive force: 0 grade | R: 7% E: 6% adhesive force: 0 grade | R: 7% E: 6% adhesive force: 0 grade | 90.2 | 91.8 | 0 grade | 2H | 115 | 31 |
| Embodiment 33 | R: 8% E: 9% adhesive force: 1 grade | R: 9% E: 7% adhesive force: 1 grade | R: 7% E: 8% adhesive force: 1 grade | 90.5 | 91.7 | 0 grade | 3B | 115 | 33 |
| Embodiment 34 | R: 6% E: 5% adhesive force: 1 grade | R: 5% E: 6% adhesive force: 1 grade | R: 7% E: 8% adhesive force: 1 grade | 82.3 | 94.6 | 0 grade | 6B | 115 | 30 |
| Embodiment 35 | R: 6% E: 7% adhesive force: 1 grade | R: 8% E: 6% adhesive force: 1 grade | R: 6% E: 7% adhesive force: 1 grade | 90.2 | 92.3 | 0 grade | 9H | 115 | 29 |
| Comparative embodiment 1 | R: 22% E: 22% adhesive force: 3 grade | R: 25% E: 23% adhesive force: 3 grade | R: 21% E: 14% adhesive force: 3 grade | 90.2 | 93.2 | 0 grade | 2H | 115 | 0.8 |
| Comparative embodiment 2 | R: 23% E: 22% adhesive force: 2 grade | R: 24% E: 21% adhesive force: 2 grade | R: 23% E: 24% adhesive force: 3 grade | 90.2 | 81.0 | 2 grade | 4B | 65 | 312 |

It can be seen from Embodiments 1 to 35 and Comparative embodiments 1 and 2 in Table 5, that when the radiative cooling functional layer has an elongation at break in the range of 1% to 300%, the radiative cooling metal plate is resistant to bending; and the attenuation of the emissivity E of the radiative cooling profiled metal plate is less than or equal to 9%, the attenuation of the reflectivity R of the radiative cooling profiled metal plate is less than or equal to 9%, and the attenuation of the adhesion of the radiative cooling functional layer is less than or equal to 1 level. The radiative cooling profiled metal plate has great aging resistance.

The respective technical features of the above embodiments can be combined arbitrarily, and for the sake of brevity of description, all possible combinations of the respective technical features in the above embodiments are not described; however, the respective technical features should be considered to be within the scope of disclosure disclosed in the present description as long as the combination of these technical features is not contradictive.

The embodiments described above merely express several embodiments of the present disclosure, and the description thereof is more specific and detailed, but cannot be construed as limiting the scope of the present disclosure. It should be noted that, for a person of ordinary skill in the art, several modifications and improvements can also be made without departing from the inventive concept, which all belong to the scope of protection of the present disclosure. Therefore, the scope of protection of the present disclosure should be regarded by the appended claims.

We claim:

1. A radiative cooling metal plate, wherein the radiative cooling metal plate comprises a metal substrate, a first adhesive layer and a radiative cooling functional layer stacked in order, the radiative cooling functional layer is located on a surface of the metal substrate, the first adhesive layer is arranged between the metal substrate and the radiative cooling functional layer, and an elongation at break of the radiative cooling functional layer is in a range of 1% to 300%.

2. The radiative cooling metal plate of claim 1, wherein an average reflectivity of the radiative cooling functional layer at a wavelength of 0.3 μm to 2.5 μm is greater than or equal to 75% and an average emissivity of the radiative cooling functional layer at a wavelength of 8 μm to 13 μm is greater than or equal to 85%.

3. The radiative cooling metal plate of claim 1, wherein under any one of three following conditions where a xenon lamp aging time is greater than or equal to 1000 hours, a wet heat aging time is greater than or equal to 1000 hours, and a salt spray aging time is greater than or equal to 600 hours, an attenuations of an average reflectivity of the radiative cooling metal plate at a wavelength of 0.3 μm to 2.5 μm is less than or equal to 20%, and an attenuations of an average emissivity of the radiative cooling metal plate at a wavelength of 8 μm to 13 μm is also less than or equal to 20%.

4. The radiative cooling metal plate of claim 1, wherein an adhesive force of the radiative cooling functional layer is 0 grade tested by a scribe test method.

5. The radiative cooling metal plate of claim 1, wherein a thickness of the radiative cooling functional layer is in a range of 50 μm to 300 μm.

6. The radiative cooling metal plate of claim 1, wherein the radiative cooling functional layer comprises an emissive layer,
a material of the emissive layer comprises a first polymer,
a mass ratio of the first polymer to the emissive layer is in a range of 85% to 100%,
a material of the first polymer comprises at least one of poly (4-methyl-1-pentene), polyethylene terephthalate, polyethylene naphthalate, poly 1,4-cyclohexylene dimethylene terephthalate, poly (ethylene terephthalateco-1, 4-cyclohexylene dimethylene terephthalate), poly (ethylene terephthalate-acetate), poly methyl methacrylate, polycarbonate, acrylonitrile styrene copolymer, acrylonitrile-butadiene styrene terpolymer, polyvinyl chloride, polypropylene, polyethylene, polyamide, ethylene-methyl acrylate copolymer, polyhydroxyethyl methacrylate, teflon, perfluoro(ethylene-propylene) copolymer, polyperfluoroalkoxy resin, polytrifluorochloroethylene, ethylene-chlorotrifluoroethylene copolymer, ethylene-tetrafluoroethylene copolymer, polyvinylidene fluoride, polyfluoroethylene, thermoplastic polyurethane, and polystyrene.

7. The radiative cooling metal plate of claim 6, wherein the radiative cooling functional layer further comprises a reflective layer and a first protective layer.

8. The radiative cooling metal plate of claim 7, wherein the reflective layer is located between the emissive layer and the first adhesive layer, the first protective is disposed on a surface of the emissive layer away from the reflective layer, and a ratio of a thickness of the reflective layer to that of the radiative cooling functional layer is in a range of 0.01% to 0.1%.

9. The radiative cooling metal plate of claim 7, wherein the reflective layer comprises a middle portion and a packaging portion disposed at both ends of the middle portion, the packaging portion is configured to insulate and protect for the middle portion, a material of the middle portion comprises at least one of silver, aluminum, stainless steel, titanium, gold and copper, and a material of the packaging portion comprises alloy and/or metal oxide.

10. The radiative cooling metal plate of claim 7, wherein a material of the first protective layer comprises a second polymer and a third polymer, a material of the second polymer is at least one of high weather resistance polyester, polyvinylidene fluoride, ethylene-tetrafluoroethylene copolymer, teflon and fluorocarbon resin, a material of the third polymer is poly methyl methacrylate, a mass ratio of the second polymer to the third polymer is 50:45-75:10.

11. The radiative cooling metal plate of claim 7, wherein a thickness of the first protective layer is in a range of 20 μm to 150 μm.

12. The radiative cooling metal plate of claim 7, wherein the radiative cooling metal plate further comprises a second adhesive layer disposed between the emissive layer and the first protective layer.

13. The radiative cooling metal plate of claim 1, wherein a material of the first adhesive layer is a solvent type adhesive comprising at least one of polyurethane, polyacrylate, organosilicon, rubber and epoxy.

14. The radiative cooling metal plate of claim 1, wherein a material of the first adhesive layer is a film type hot melt adhesive comprising at least one of ethylene acrylic acid copolymer, ethylene-vinyl acetate copolymer, poly methyl methacrylate, maleic anhydride grafted polymer, hydrogenated styrene-butadiene block copolymer, styrene-isoprene-styrene block copolymer, polystyrene-butadiene copolymer, polyurethane, hydrogenated petroleum resin, rosin resin, ethylene-butene copolymer and ethylene-octene copolymer.

15. The radiative cooling metal plate of claim 1, wherein a thickness of the first adhesive layer is in a range of 3 μto 25 μm.

16. The radiative cooling metal plate of claim 7, wherein the radiative cooling metal plate further comprises a second protective layer which is a release layer, the second protective layer is disposed on a surface of the first protective layer away from the emissive layer, a material of the second protective layer comprises one of polyethylene terephthalate, polyethylene and polypropylene, a bonding force of the second protective layer is in a range of 50 g/25 mm to 500 g/25 mm.

17. The radiative cooling metal plate of claim 1, wherein a thickness of the metal substrate is in a range of 100 μm to 2000 μm.

18. A method for preparing the radiative cooling metal plate of claim 1, comprising:
   providing the metal substrate; and
   forming the first adhesive layer and the radiative cooling functional layer in order on the surface of the metal substrate.

19. The method of claim 18, wherein before the step of forming the first adhesive layer and the radiative cooling functional layer in order on the surface of the metal substrate, further comprising a step of cleaning the metal substrate.

20. A radiative cooling profiled metal plate, wherein the radiative cooling profiled metal plate is formed by pressing the radiative cooling metal plate of claim 1.

* * * * *